(12) United States Patent
Nix et al.

(10) Patent No.: US 7,450,603 B2
(45) Date of Patent: Nov. 11, 2008

(54) SYSTEM AND METHODS OF WIRELESS VEHICLE TO VEHICLE DATA SHARING

(75) Inventors: Axel Nix, Birmingham, MI (US);
Robert M. Riley, Jr., Novi, MI (US);
James R Grace, Royal Oak, MI (US);
James M. Kortge, Ferndale, MI (US)

(73) Assignee: General Motors Corporation, Detroit, MI (US)

( * ) Notice: Subject to any disclaimer, the term of this patent is extended or adjusted under 35 U.S.C. 154(b) by 882 days.

(21) Appl. No.: 10/931,135

(22) Filed: Aug. 31, 2004

(65) Prior Publication Data
US 2006/0045115 A1    Mar. 2, 2006

(51) Int. Cl.
*H04J 3/26* (2006.01)
(52) U.S. Cl. .............. 370/432; 455/414.3; 455/414.4; 455/569.2
(58) Field of Classification Search ............ 370/477; 455/414.3, 569.2; 340/901, 995.1; 707/104.1
See application file for complete search history.

(56) References Cited

U.S. PATENT DOCUMENTS

| | | | | |
|---|---|---|---|---|
| 6,150,961 | A * | 11/2000 | Alewine et al. | 340/995.1 |
| 6,407,673 | B1 * | 6/2002 | Lane | 340/901 |
| 6,870,487 | B2 * | 3/2005 | Nuesser et al. | 340/901 |
| 7,113,773 | B2 * | 9/2006 | Quick et al. | 455/414.3 |
| 7,139,595 | B2 * | 11/2006 | Lane | 455/569.2 |
| 2002/0030611 | A1 | 3/2002 | Nuesser et al. | |
| 2005/0273473 | A1 * | 12/2005 | Grace et al. | 707/104.1 |

FOREIGN PATENT DOCUMENTS

| | | |
|---|---|---|
| DE | 10041099 C2 | 10/2002 |
| WO | 0127790 A1 | 4/2001 |
| WO | 0143364 A1 | 6/2001 |

* cited by examiner

*Primary Examiner*—Chi H. Pham
*Assistant Examiner*—Albert T Chou

(57) ABSTRACT

System, methods, and apparatus are provided for wireless vehicle-to-vehicle sharing of multimedia data. The system includes a data storage device configured to store multimedia data packets transmitted by a system broadcast, a processor coupled to the data storage device and configured to determine a non-received group of multimedia data packets based on the stored multimedia data packets of the system broadcast, and a transceiver coupled to the processor. The transceiver is configured to receive multimedia data packets transmitted from the system broadcast and multimedia data packets transmitted from a system vehicle in response to the request signal. The method includes the steps of determining non-received multimedia data packets based on a system broadcast in a first wireless protocol, and requesting multimedia data packets of the non-received multimedia data packets in a second wireless protocol from system vehicles.

21 Claims, 5 Drawing Sheets

SYSTEM AND METHODS OF WIRELESS VEHICLE TO VEHICLE DATA SHARING

TECHNICAL FIELD

The present invention generally relates to multimedia broadcast systems and methods, and more particularly relates to wireless broadcast of data to and among vehicles.

BACKGROUND

Vehicle operators tend to spend a significant amount of time in their respective vehicles particularly when commuting from a home to a workplace, running errands, conducting business, vacationing, or for many other reasons. Most vehicles tend to be intermittently operated and for various lengths of time and for various purposes. For example, passenger vehicles may be used for transportation from home and a workplace, between work sites, and along any number of different routes among different places. This time is significant enough that some vehicles come equipped with a variety of consumer electronics such as compact disc (CD) players, cassette tape players, radios, satellite radios, electronic gaming, and digital video disc (DVD) players. Some owners may also choose to equip their vehicle with aftermarket consumer electronics in the event their vehicles lack such consumer electronics or for purposes of customization. These and other entertainment or information resource electronic devices provide a passenger in the vehicle with time-occupying options and may improve the passenger's quality of travel.

Consumer electronics such as CD players, cassette tape players, DVD players, and electronic gaming generally have related media content for playback residing on a localized storage medium. For example, many onboard navigation systems utilize geographic information stored on CD's. This information may be downloaded to a memory associated with the navigation system, located in the vehicle, or directly accessed from the CD by the navigation system. In another example, DVD players commonly play media that is stored on a DVD.

Consumer electronics such as radios, satellite radios, and cellular phones generally have associated media content transmitted in real-time. For example, satellite radios receive audio broadcasts carried in a selected frequency band and play such broadcasts when the satellite radio is activated and tuned to a particular frequency. In general, these forms of consumer electronics use transmission methods that may have limited types of transmitted media and reception modes. In the past, the transmission of a large data file usually required a receiver to be dedicated to such transmission and activated for a substantially long and continuous period of time in order to download the data file using conventional transmission techniques. For example, using some transmission techniques, the receiver may be required to continuously and sequentially receive data transmission from a start header to an end header. Interruption of such reception generally results in an acquisition of data that may not be reassembled into the original data file. These requirements generally make transmission of large data files impractical for vehicle applications due to variable and intermittent operations, such as previously mentioned, commonly associated with vehicles.

Accordingly, it is desirable to provide a system and method for wireless transfer of multimedia data among vehicles. In addition, it is desirable to provide a multimedia system for a vehicle that is capable of exchanging multimedia data with other system vehicles during intermittent operation of the vehicle. Furthermore, other desirable features and characteristics of the present invention will become apparent from the subsequent detailed description of the invention and the appended claims, taken in conjunction with the accompanying drawings and this background of the invention.

BRIEF SUMMARY

According to various exemplary embodiments, a system, methods, and apparatus are provided for wireless vehicle-to-vehicle exchange of multimedia data. In a first exemplary embodiment, a multimedia system for a vehicle is provided having a data storage device configured to store multimedia data packets transmitted by a system broadcast, a processor coupled to the data storage device and configured to determine a non-received group of multimedia data packets based on the stored multimedia data packets of the system broadcast, and a transceiver coupled to the processor. The transceiver is configured to transmit a request signal for multimedia data packets of the non-received group of multimedia data packets and receive multimedia data packets transmitted from the system broadcast and multimedia data packets transmitted from a system vehicle in response to the request signal.

In a second exemplary embodiment, a wireless network apparatus for vehicles is provided having a vehicle receiver configured to receive multimedia data packets transmitted from a system broadcast, a data storage device coupled to the vehicle receiver, a processor coupled to the data storage device, and a transceiver coupled to the processor. The data storage device is configured to store the multimedia data packets received by the vehicle receiver and the multimedia data packets received by the transceiver. The processor is configured to identify multimedia data packets stored in the data storage device with a multimedia file and determine a non-received group of multimedia data packets and a received group of multimedia data packets based on the multimedia data packets stored in the data storage device. The transceiver is configured to receive multimedia data packets transmitted from a system vehicle and a request signal transmitted from the system vehicle and transmit at least one signal selected from a signal requesting multimedia data packets of the non-received group of multimedia data packets, a status signal indicating the received group of multimedia data packets, and a group of multimedia data packets in response to the request signal transmitted by the system vehicle.

In a third exemplary embodiment, a multimedia system for a vehicle is provided having a first receiver configured to wirelessly receive multimedia data packets transmitted from a system broadcast during operation of the vehicle, a data storage device coupled to the first receiver, a processor coupled to the data storage device, a vehicle-network transmitter coupled to the processor and the data storage device, and a second receiver coupled to the data storage device. The data storage device is configured to store the multimedia data packets received by the first receiver and the multimedia data packets received by the second receiver. The processor is configured to access the stored multimedia data packets in the data storage device, identify each of the stored multimedia data packets with a multimedia data file, and determine non-received multimedia data packets based on the stored multimedia data packets in the data storage device. The vehicle network transmitter is configured to transmit a request for the non-received multimedia data packets. The second receiver is configured to wirelessly receive multimedia data packets transmitted from a system vehicle and a request signal for multimedia data packets transmitted from the system vehicle during operation of the vehicle.

In a fourth exemplary embodiment, a method of wireless vehicle-to-vehicle sharing of multimedia data is provided having the steps of determining non-received multimedia data packets based on a system broadcast in a first wireless protocol, and requesting multimedia data packets of the non-received multimedia data packets in a second wireless protocol from system vehicles.

BRIEF DESCRIPTION OF THE DRAWINGS

The present invention will hereinafter be described in conjunction with the following drawing figures, wherein like numerals denote like elements.

DETAILED DESCRIPTION

The following detailed description of the invention is merely exemplary in nature and is not intended to limit the invention or the application and uses of the invention. Furthermore, there is no intention to be bound by any theory presented in the preceding background, brief summary, or the following detailed description.

Figure 1:
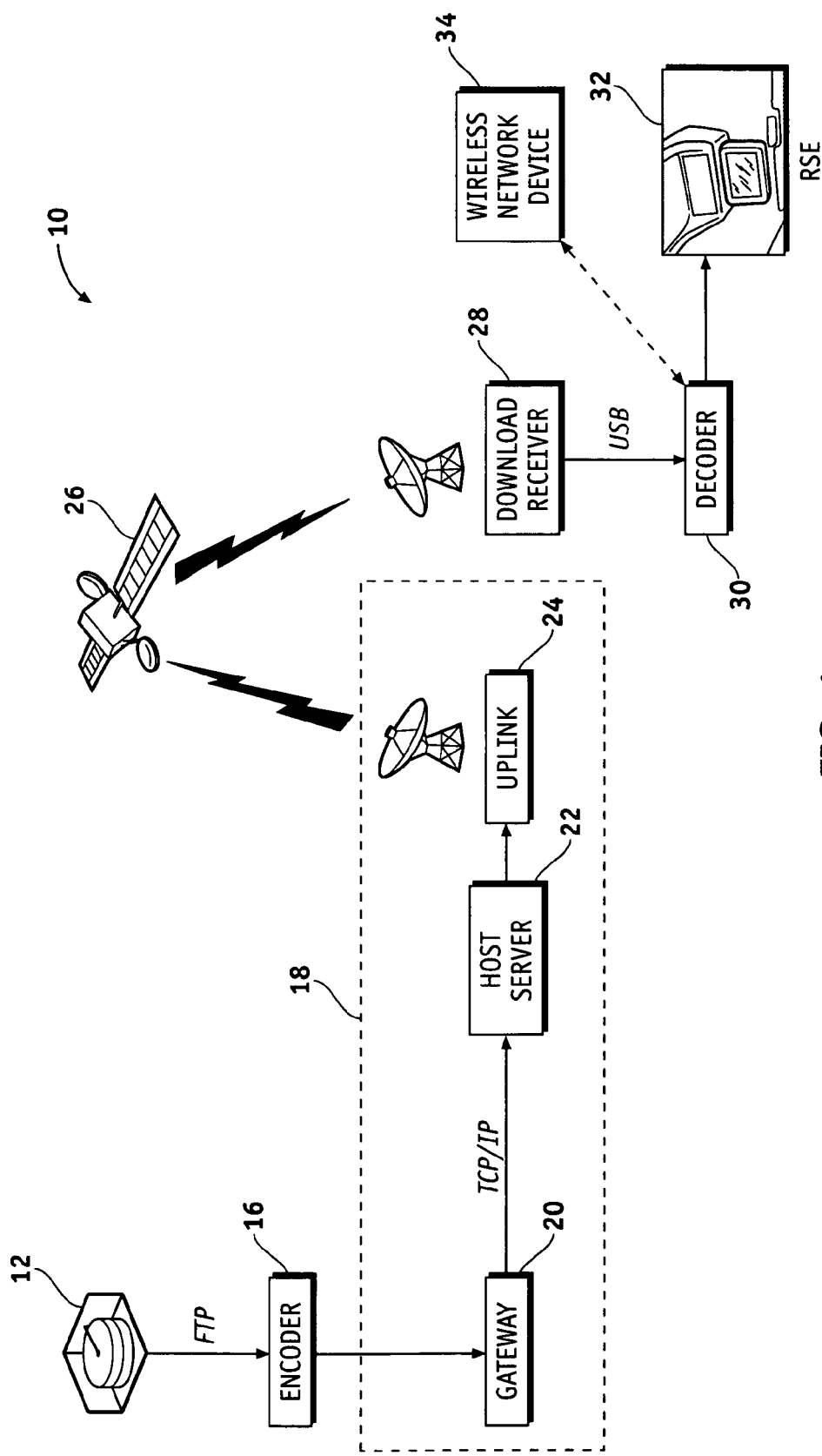
FIG. 1 is a schematic diagram illustrating a system for wireless broadcast of multimedia to vehicles.

Referring to FIG. 1, a schematic diagram is presented that illustrates an exemplary embodiment of a system 10 for wireless broadcast of multimedia to vehicles. In this embodiment, the system 10 includes a multimedia data file that may be stored in a conventional storage medium 12, an encoder 16 that accesses the multimedia data file from the storage medium 12 and converts the multimedia data file into groups of encoded data packets, and a wireless transmitter 18 that prepares the encoded data packets for wireless transmission and broadcasts the same from the encoder 16 for a pre-determined broadcast period and at a pre-determined data transmission rate.

As used herein, the term "file" refers to any data that is stored at one or more sources and is to be delivered as a unit to one or more destinations. For example, a document, an image, and a file from a file server or computer storage device, are all examples of "files" that may be delivered. Files can be of known size, such as a one megabyte image stored on a hard disk, or can be of unknown size, such as a file taken from the output of a streaming source. A file may be considered as a sequence of input symbols, where each input symbol has a position in the file and a value.

The term "transmission" is referred to herein as a process of transmitting data from one or more senders to one or more recipients through a channel in order to deliver a file.

The term "encoder" is referred to herein as a circuit, device, module or code segment that generates data from an input file that assists with recovery of data erasures.

The pre-determined broadcast period and data rate may be based on an average vehicle operation duration and/or a probability of occurrence of the average vehicle operation duration. Other data related to vehicle operation, such as may be related to providing a greater percentile of customers with a time period to receive sufficient data packets for reassembling one or more original multimedia files, may also be used to determine the broadcast period and data transmission rate.

It should be appreciated that the blocks of FIG. 1, as well as the blocks in the other diagrams disclosed herein, can represent functional elements and discrete hardware elements. For example, in one exemplary embodiment of the invention, some of the functions or hardware elements illustrated in FIG. 1 may be implemented in a single processor unit. Alternatively, a portion of the functions may be implemented in a single processor unit in combination with hardware elements. The functions can be implemented all in hardware, all in software, or a combination of hardware and software can be used.

Each multimedia data file corresponds to a multimedia content. For simplification of explanation, a single multimedia data file is described herein although more than one multimedia data file may be stored in the storage medium 12, broadcasted by the wireless transmitter 18, or otherwise processed by the various components of the system 10. Examples of conventional storage medium include, by way of example and not limitation, compact disc (CD), digital video disc (DVD), read-only memory (ROM), programmable ROM types, random access memory (RAM), floppy disk, magnetic tape, flash memory, hard disk, etc. The particular type of storage medium is not critical to the operation of the invented multimedia system so long as the storage medium has sufficient memory size for containing the multimedia file, in whole or in portions thereof.

The encoder 16 provides multimedia files in the form of groups of data packets, also referred to herein as meta packets, to the transmitter 18 for broadcast. The encoder 16 may access the multimedia files from the storage medium 12 using a conventional data protocol such as file transfer protocol (FTP). In one embodiment, these meta packets are algorithmically generated from the original multimedia file such that the original file may be reassembled upon receipt of a threshold number of meta packets. For example, the meta packets may be coded in an information additive manner where the encoded data generally assists in recovering the original file rather than being duplicative. A receiver of the encoded meta packets may begin reception at any given point of the transmission, and the transmitter 18 does not generally stop transmission after a pre-determined number of groups of data packets are generated and transmitted.

At times, data may emanate from more than one sender, or some portion of the transmitted data may be dropped en route to the recipient(s). When transmitting or broadcasting data, data erasure and data incompleteness are two concerns. Data erasure may occur when the channel loses or drops data. Data incompleteness may occur when a recipient does not start receiving data until some of the data has already passed, the recipient stops receiving data before transmission ends, or the recipient intermittently stops and starts receiving data. As an example of data incompleteness, a moving satellite sender may be transmitting data representing an input file and start the transmission before a recipient is in range. Once the recipient is in range, data may be received until the satellite moves out of range, at which point the recipient can redirect a data receiver to start receiving the data about the same input file being transmitted by another satellite that has moved into range. As another example, routers may drop packets when associated buffers are full or nearly full (e.g., congested), and routers may also drop packets for competing packets and/or to enforce rate limitations.

The encoding/decoding scheme used with the system 10 generally reduces the effects of data erasure and data incompleteness. In one exemplary embodiment, a recipient may receive data generated by multiple senders or by one sender using multiple connections. For example, to generally shorten a download time, a recipient may simultaneously connect to more than one sender for transmitting data related to the same file. As another example, in a multicast transmission, multiple multicast data streams may be transmitted to assist recipients with connecting to one or more of these streams such as by matching an aggregate transmission rate with a bandwidth of a channel connecting the sender with the recipients. The particular standard of wireless transmission is not critical to the invention so long as an original multimedia data file is converted to a group of encoded data packets that may be reassembled upon receipt of a threshold number of encoded data packets. Examples of wireless transmission standards include, but are not limited to, IEEE 802.11 series standards, Bluetooth, HiperLAN1, and HiperLAN2.

The channel may be a real-time channel with the channel moving data from the sender to the recipient as the channel receives the data, or the channel may be a storage channel that stores some or all of the data in transit from the sender to the recipient. An example of the latter is disk storage or other storage device. In this example, a program or device that generates data may be thought of as the sender that transmits the data to a storage device, and the recipient may be the program or device that reads the data from the storage device. In one exemplary embodiment, the mechanisms that the sender uses to load the data onto the storage device, the storage device itself, and the mechanisms that the recipient uses to retrieve the data from the storage device may collectively form the channel.

In one exemplary embodiment, the encoder 16 generates groups of output symbols from input symbols, where a sequence of input symbol values represents a corresponding input file. Each input symbol has a position in the input file and a value associated therewith. A variety of other encoding schemes may be used with the encoder 16 that allow reassembly of the original file upon receipt of a threshold number of data packets and are not limited to initiating reception at a particular point of the transmission.

Transmitting a file generally involves generating, forming, or extracting input symbols from an input file, encoding those input symbols into one or more groups of output symbols, where each group of output symbols is generated based on an associated key independently of all other groups of output symbols, and transmitting the groups of output symbols to one or more recipients over a channel. In one exemplary embodiment, meta packets are obtained from an original multimedia file on the storage medium 12 by the encoder 16 and encoded into one or more groups of encoded meta packets for transmission. In this embodiment, each group of meta packets is generated based on an associated key. The encoded meta packets may contain the multimedia content in a digitally compressed format (e.g., sound, images, and video). In another exemplary embodiment, a descriptive element having additional information about the compressed multimedia contents is included with the encoded meta packets in a file header used for broadcast. The descriptive element may include information not normally encoded with compressed multimedia contents including, by way of example and not of limitation, best storage/directory information for the customer, parental control information, relevant vehicle information, and subscription control information.

In one exemplary embodiment, the transmitter 18 includes a gateway 20 receiving the groups of meta packets from the encoder 16, a host server 22 coupled to the gateway 20, and an uplink device 24 coupled to the host server 22. This embodiment is exemplary of networked communication systems where the encoded meta packets are routed through one or more components of a network, such as through a gateway and a host server providing wireless transmission services. For example, a content provider may connect to a network via the gateway 20 and transmit encoded meta packets using transfer control protocol/Internet protocol (TCP/IP) to the host server 22 that is connected to the network. The gateway 20 is a processing unit that may be a node on the network controlling access to the network and/or routing of data packets to a desired wireless transmission server, such as the host server 22.

The host server 22 may include memory for storing the encoded meta packets for transmission. The host server may be connected to any number and variety of uplink devices, such as a satellite dish, that upload the encoded meta packets for wireless transmission or broadcast. The uplink device 24 and/or host server 22 may include known components, such as a modulation/coding unit, for accomplishing modulation or multiplexing, depending on a particular signal processing mode, as will be appreciated by those of skill in art. For example, the uplink device 24 may include a radio transmitter that modulates the encoded meta packets for wireless broadcast. Although this exemplary embodiment of the system 10 is described with respect to a networked transmitter, the wireless broadcast or transmission aspect of the invented system may also have partially or non-networked transmitters or transmission systems. For example, the encoder 16 may be directly connected to the host server 22 or to the uplink device 24.

The system 10 may further include a transponder 26, such as a satellite or signal repeater/relay, receiving the transmitted group(s) of encoded meta packets from the uplink device 24, a downlink receiver 28 that receives the group(s) of encoded meta packets from the transponder 26, a decoder 30 coupled to the downlink receiver 28 that reassembles the original multimedia file from the encoded meta packets, and a multimedia playback device 32 coupled to the downlink receiver 28 having operational software that reads and plays the original multimedia data file. The playback device 32 may include, by way of example and not of limitation, a rear seat entertainment (RSE) device such as a video display mounted in the back of a front seat headrest for viewing by passengers. The received encoded meta packets and/or the reassembled multimedia file may be stored in memory associated with the decoder 30, the playback device 32, a mass storage device associated with such components, or a stand-alone mass storage device, as described in greater detail hereinbelow. The system 10 may optionally include a stand-alone wireless network device 34 coupled to the decoder 30 that communicates with other system vehicles to exchange encoded meta packets that may be missing from a respective system vehicle.

In this exemplary embodiment, the downlink receiver 28, decoder 30, and playback device 32 are located on a vehicle, which can be any number of land, air, or water vehicle, such as an automobile. Although the present invention is described in the context of receiving large multimedia data files in a vehicle application, the downlink receiver 28, decoder 30, and playback device 32 may be located on a variety of other personal transportation or as a stand-alone portable device. In this exemplary embodiment, the downlink receiver 28 may be connected to the decoder 30 via a universal serial bus (USB) or other conventional communication line.

The downlink receiver 28 includes, but is not limited to, conventional signal demodulation and/or de-multiplexing components for extracting the encoded meta packets from the wireless transmission signal. Activation of the downlink receiver 28 is generally coordinated with the operation of the vehicle. For example, the downlink receiver 28 may initiate and conduct reception of the encoded meta packets whenever the vehicle is operating, such as with the engine running or whenever battery power is supplied to various vehicle components. Receiving and reconstructing a copy of the input file (i.e., the original multimedia file) includes receiving a set or subset of groups of output symbols (i.e., meta packets) from one of more data transmission streams, and decoding the input symbols from the values and keys of the received groups of output symbols.

After the encoded meta packets are extracted from the wireless transmission signal, the downlink receiver 28 transmits the encoded meta packets to the decoder 30, and the decoder 30 decodes and reassembles the original multimedia file for playback. The term "decoder" is referred to herein as a circuit, device, module or code segment that reconstructs the input symbols from the groups of output symbols received by the recipient. In one embodiment, the decoder 30 is configured to recover input symbols from the values of one or more groups of output symbols (i.e., encoded meta packets) and possibly from information about the values of other input symbols that may have previously been recovered. The decoder recovers some input symbols from some groups of output symbols, which in turn allows the decoder to decode other input symbols from those decoded input symbols and previously received groups of output symbols, and so on, thus causing a "chain reaction" recovery of input symbols of the original multimedia file being reconstructed at the recipient. In one exemplary embodiment using software for decoding, such decoding software may be updated using the broadcasting system 10 but identified as operational software elements using the aforementioned descriptive element in the broadcast.

Downloads may not need to be scheduled or coherent using this encoding/decoding scheme which is ideally suited for video-on-demand multimedia as well as receiving and reassembling other multimedia files. For example, the encoding/decoding of the system 10 allows a video to be broadcast as a continuous stream on a channel without coordination between the receiver 28 and the transmitter 18. The receiver 28 may simply tune into a broadcast channel for a video of interest and capture sufficient data to reconstruct the original video without having to determine when the transmission started or how to get copies of lost portions of the broadcast. In one exemplary embodiment, once the receiver 28 receives a threshold number of encoded meta packets, the decoder may recover a sufficient number of input symbols from the values of one or more groups of output symbols (i.e., encoded meta packets), and possibly from information about the values of other input symbols, to reconstruct or reassemble the original multimedia file.

As previously mentioned, the transmitter 18 may transmit the groups of encoded meta packets for a pre-determined broadcast period based on an average vehicle operation duration and/or a probability of occurrence of the average vehicle operation duration. For example, the broadcast period may be selected such that the downlink receiver 28 is more likely to receive the aforementioned threshold number of encoded meta packets, for reconstruction of the original multimedia file, during a minimum time period of downlink receiver operation. In one exemplary embodiment, this broadcast period is within a range of time that substantially maximizes efficient use of transmission resources while meeting the threshold number of encoded meta packets. Based on the average vehicle operation duration and a selected data transmission rate, a probability of the downlink receiver 28 being activated for a duration sufficient to receive the threshold number of encoded meta packets may be determined and used to select the broadcast period.

Although the downlink receiver 28 is typically activated during vehicle operation, this duration may vary from operator to operator. Based on the average vehicle operation duration and/or probability of occurrence of this duration, the data transmission rate may be selected such that downlink receiver 28 operation has a greater probability of receiving the threshold number of meta packets for one or more different multimedia files. The average vehicle operation duration and probability of occurrence of this duration may be determined through conventional sampling methods of a desired population. Characteristics of the population may be selected from any number of criteria such as geographic region, vehicle type, customer profile, or any other demographics. In one exemplary embodiment, to generally increase the likelihood that a higher percentile of customers or vehicle operators will be operating their respective vehicles for a time period sufficient to receive enough meta packets, for reassembling one or more original multimedia files, different multimedia content may be concurrently transmitted at different data rates within a channel having a transmission bandwidth.

For example, a 120 kbps allocation may be provided for a transmission bandwidth. For a data transmission rate of about 3 MB per min., a movie A of about 100 min. in duration and having about 300 MB of data may require about 7 hours of vehicle operation to receive the threshold number of encoded meta packets for reassembling the original multimedia content. In another example, a 120 kbps allocation may also be provided for the transmission bandwidth but divided among three different movies (e.g., a movie A, a movie B, and a movie C) that are concurrently broadcasted. Each of the movies has substantially the same duration of about 100 min. In this example, movie A may be transmitted over a 60 kbps portion, movie B may be transmitted over a 40 kbps portion, and movie C may be transmitted over a 20 kbps portion such that the combination of the portions fits within the transmission bandwidth. For a data transmission rate of about 3 MB per min., about 14 hours of vehicle operation is preferable to receive the threshold number of encoded meta packets to reassemble the original multimedia content of movie A, about 21 hours of vehicle operation is preferable to receive the threshold number of encoded meta packets to reassemble the original multimedia content of movie B, and about 42 hours of vehicle operation is preferable to receive the threshold number of encoded meta packets to reassemble the original multimedia content of movie C. In this example, customers or vehicle operators that spend more time operating their vehicles generally receive more multimedia content. For example, customers who spend more time operating their vehicle may receive enough meta packets to reassemble movie B and movie A, and customers who spend an even more time in their vehicle may receive enough meta packets to reassemble movie A, movie B, and movie C. The data rate may be selected based on the number of concurrent multimedia transmissions and the available transmission bandwidth.

One example of multimedia content provided by the system 10 is a video-on-demand service for vehicles. In one exemplary embodiment, the video-on-demand service may be offered on a subscription basis to the customer. To facilitate conditional access to the multimedia contents of the service, access to the multimedia files stored on the decoder 30, playback device 32, or mass storage device may be controlled using the operational software of the playback device 32. For example, the stored multimedia files may be encrypted to limit accessibility in the event the multimedia files on the mass storage device are accessed using a device other than the playback device 32. Activation and deactivation of the playback device 32 may be accomplished by transmitting unique vehicle specific subscription control files using the descriptive element of the file header information or using an alternative communication channel. New groups of encoded meta packets, corresponding to new multimedia content, may be received and stored on the decoder 30 or playback device 32 irrespective of the subscription status.

Figure 2:
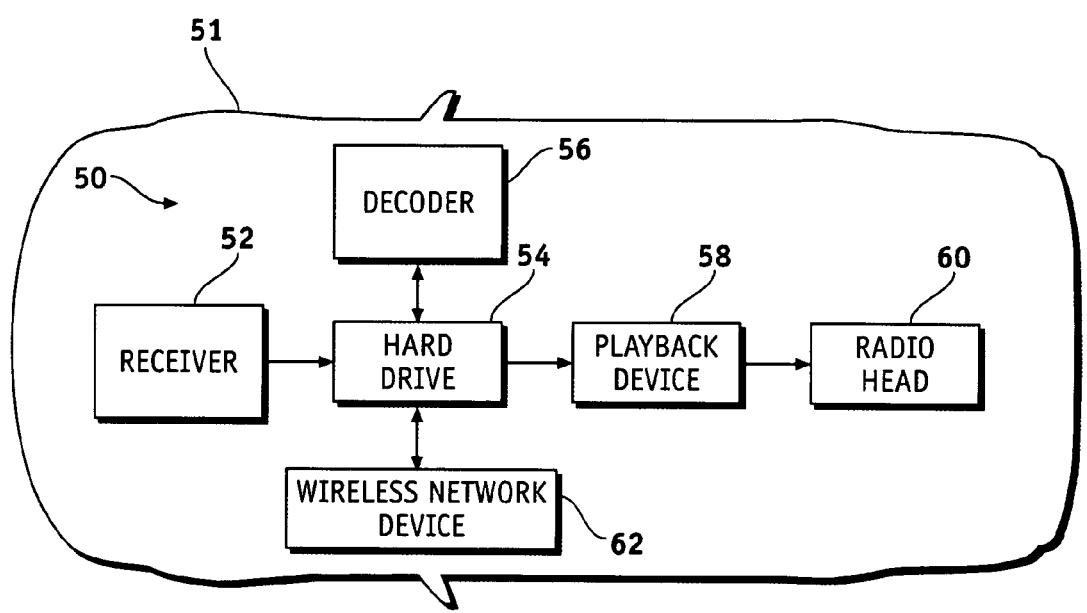
FIG. 2 is a block diagram showing a multimedia system for a vehicle.

FIG. 2 is a block diagram of an exemplary embodiment of a multimedia system 50 for a vehicle 51. The system 50 includes, but is not limited to, a vehicle-based receiver 52 configured to wirelessly receive one or more groups of encoded meta packets at a corresponding data rate from a wireless broadcast, such as from the transmitter 18 shown in FIG. 1, a mass storage device 54 coupled to the receiver 52, a vehicle-based transceiver 62 coupled to the mass storage device 54, a decoder 56 coupled to the mass storage device 54 that accesses the storage device 54 and reassembles the original multimedia file, a playback device 58 coupled to the mass storage device 54 that generates audio/video signals associated with the playback of the multimedia file, and a multimedia output device 60 that reproduces and displays the multimedia content.

In this embodiment, delivery of multimedia files may be used for video-on-demand services with a rear seat entertainment system of the vehicle 51. When the vehicle is operating, the system 50 may receive new meta packets and assemble the original video files when the threshold number of encoded meta packets is received by the receiver 52. In one exemplary embodiment, the mass storage device 54 is a hard drive that contains the received encoded meta packets. Other types of large memory writable/rewritable devices may also be used for the mass storage device 54 such as magnetic tape and flash memory. The particular type of storage medium is not critical to the operation of the multimedia system 50 so long as the storage medium has sufficient memory size for containing multimedia files, in whole or in portions thereof. The mass storage device 54 may be partitioned such that memory is allocated and available for all meta packets that may be required for reassembly of files being broadcasted. In one exemplary embodiment, meta packets of multimedia files that are no longer transmitted and that were not assembled/reassembled may be deleted to increase available memory.

The decoder 56 retrieves groups of encoded meta packets received by the receiver 52 and transceiver 62 that are stored on the mass storage device 54 after the threshold number of encoded meta packets are received for reassembling the original multimedia content. The threshold number is not reliant on any particular order of the encoded meta packets. Decoding is then conducted by the decoder 56 to obtain multimedia data files corresponding to the original multimedia content which are assembled to form the original multimedia content for playback.

Assembled multimedia files may be made available to the customer for viewing. Because the continuous in-flow of new multimedia files consumes memory, the storage capacity of the mass storage device 54 may be exceeded. Older files stored in the mass storage device 54 may be deleted and replaced with new content to minimize this occurrence. In one embodiment, the customer may "lock" selected files to prevent replacement of such files by new files.

The playback device 58 may further conduct decoding of the multimedia files to produce audio and video output signals for input to the multimedia output device 60. For example, the multimedia files may contain audio encoding for different audio effects such as surround sound. Additionally, the assembled multimedia files may be encrypted such that an appropriate playback device 58, having operational software for decrypting the assembled media files, may access the multimedia files and play the same. This encryption/decryption matching of the assembled multimedia files and the playback device 58 is useful for limiting access to the broadcasted multimedia files to customers partaking in a corresponding multimedia subscription service and using "authorized" playback devices. The multimedia output device 60 may also include, but is not limited to, conventional audio speakers and video displays.

In a first exemplary embodiment, the mass storage device 54, decoder 56, and playback device 58 may be combined into one physical module. One advantage of this embodiment is that the mass storage device 54 may be used for other purposes in the playback device 58 without data connection between the playback device 58 and the mass storage device 58. Other advantages of this exemplary embodiment include, but are not limited to, availability of the mass storage device 54 for storing compressed audio content from CDs when the playback device 58 is a CD R/W (e.g., MP3 ripping) or for storing digital map data from CDs when the playback device 58 is an electronic navigation aid.

In a second exemplary embodiment, the receiver 52, mass storage device 54, and decoder 56 may be combined into one physical module. This exemplary embodiment is particular suited to use existing audio and video inputs associated with a pre-existing playback device 58 in the vehicle 51. For example, minimal structural changes may be required by the addition of this module to an existing infotainment system because the module may be simply coupled with the infotainment system using associated audio/video inputs. Additionally, this exemplary embodiment may be readily used with different vehicles and may assist with part reuse.

In a third exemplary embodiment, the receiver 52, mass storage device 54, decoder 56, playback device 58, and wireless network device 62 may all be combined into one physical module. This exemplary embodiment may minimize overhead costs commonly associated with each separate component, such as separate power supplies and serial data interfaces.

Figure 3:
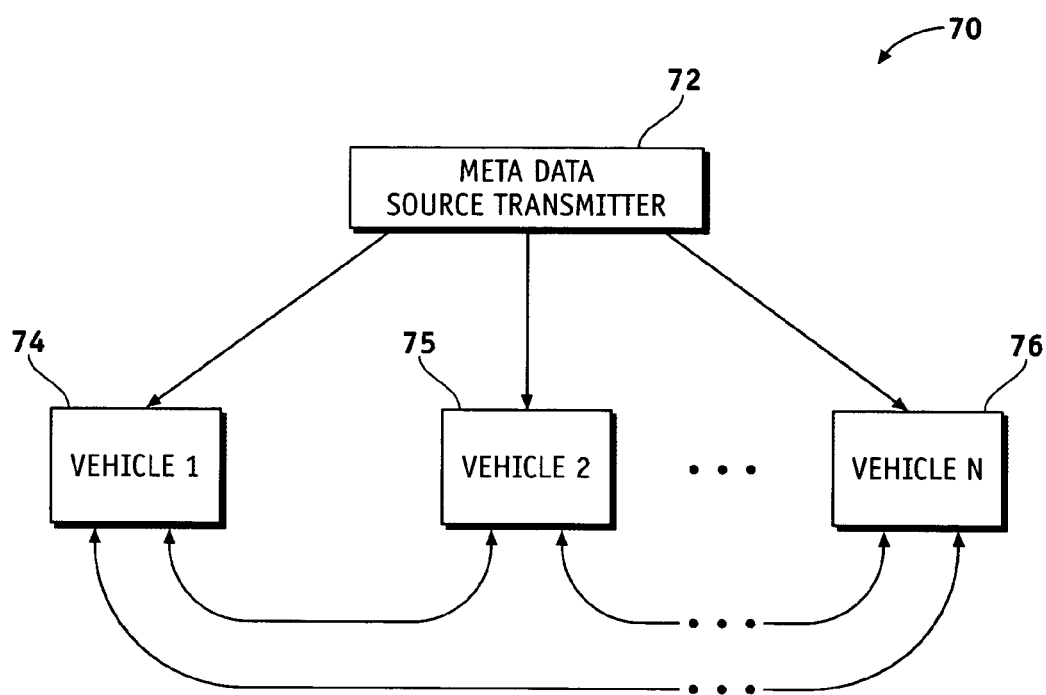
FIG. 3 is a block diagram showing an exemplary embodiment of a system for vehicle-to-vehicle multimedia data exchange.

FIG. 3 is a block diagram showing an exemplary embodiment of a system 70 for vehicle-to-vehicle multimedia data exchange. A data source transmitter 72, such as the transmitter 18 shown in FIG. 1 and described hereinabove in connection with the wireless broadcast system 10, transmits encoded meta packets to any number of system vehicles 74, 75, 76 (e.g., vehicle 1, vehicle 2, and through vehicle N). The number of encoded meta packets and/or a range of encoded meta packets received by a particular vehicle generally varies depending on the operation duration of such vehicle. In this exemplary embodiment, a difference in a content collection associated with one vehicle from the content collection associated with another vehicle is generally related to the difference in duration of operation for each vehicle.

In one exemplary embodiment, each new encoded meta packet broadcasted from the transmitter 72 is unique from any other packet previously broadcasted. The duration each vehicle is in operation and receiving data represents a specific subset of all of the unique packets that have been broadcasted by the transmitter 72. In this exemplary embodiment, for any given two vehicles having different operation durations, the difference in respective subsets of received packets associated with each vehicle represents "new" information that each vehicle may share for reconstructing the original transmitted multimedia file. Each of the vehicles 74, 75, 76 may exchange received encoded meta packets with other vehicles in the system 70. For example, a first vehicle 74 may share encoded meta packets with a second vehicle 75 that may not have received such encoded meta packets. Similarly, the first vehicle 74 may share encoded meta packets with any "N" vehicle 76 in the system 70 that may not have received such encoded meta packets.

Using this wireless network of vehicles, encoded meta packets may be shared among the vehicles in the system 70 and in a relatively short period of time. Sharing of encoded meta packets among the vehicles generally accelerates delivery of the corresponding multimedia file to such vehicles. One benefit of this wireless network exchange of encoded meta packets is that less transmission bandwidth may be required at the originating broadcast, such as from the transmitter 72, to complete file transfer to the vehicles 74, 75, 76 in the system 70. An additional benefit is that a vehicle that did not receive enough packets within an allotted file broadcast window may be able to reconstruct the file by receiving enough encoded meta packets through the vehicle-to-vehicle network exchange.

Figure 4:
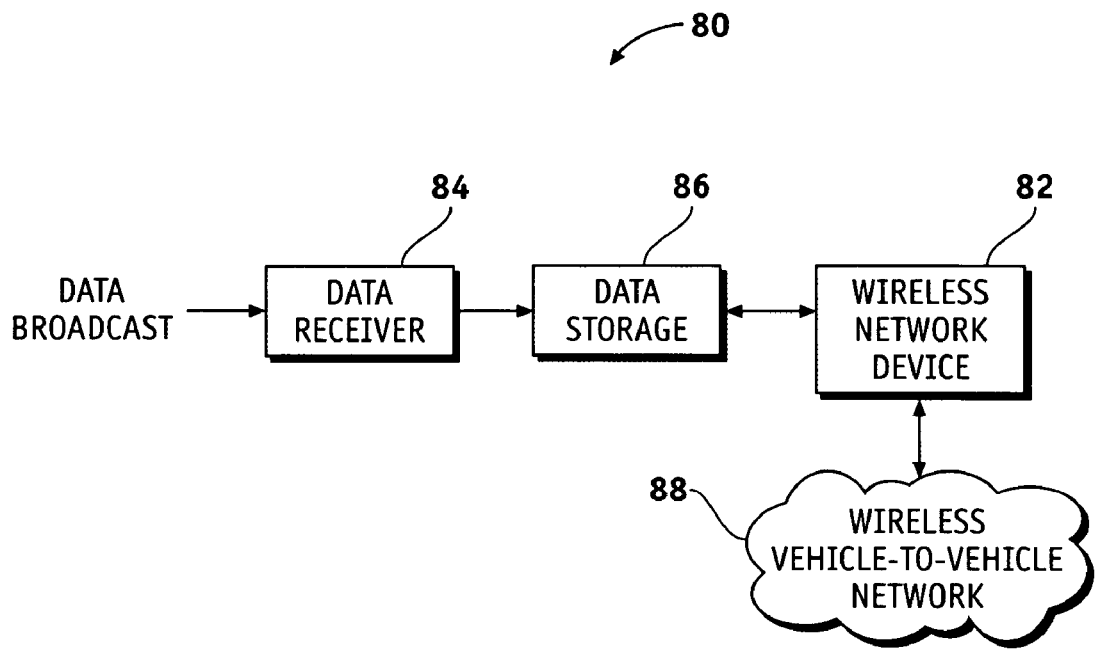
FIG. 4 is a block diagram showing an exemplary embodiment of a multimedia system with a wireless network device for a vehicle.

FIG. 4 is a block diagram showing an exemplary embodiment of a multimedia system 80 with a wireless network device 82 for a vehicle. The multimedia system 80 includes, but is not limited to, a data receiver 84, a data storage device 86 coupled to the data receiver 84, and a wireless network device 82 coupled to the data storage device 86 that communicates with a wireless vehicle-to-vehicle network 88. In this exemplary embodiment, a data broadcast, such as from the transmitter 18 shown in FIG. 1, of the original multimedia file in the form of a group of encoded meta packets is received by the data receiver 84, such as the downlink receiver 28 shown in FIG. 1. The meta packets are stored in the data storage device 86 for decoding and reassembling of the original multimedia file upon receipt of the threshold number of encoded meta packets, as previously mentioned hereinabove. The wireless network device 82 of the multimedia system 80 may be similar to the wireless network devices 34, 62 shown in FIGS. 1 and 2, respectively. Additionally, although not shown in FIG. 4, the wireless network device 82 may also be coupled to a decoder such as the decoder 30 shown in FIG. 1.

In one exemplary embodiment, the wireless network device 82 includes, but is not limited to, a transmitter and a receiver that allows the vehicle to communicate with other system vehicles regarding the encoded meta packets. Information regarding the encoded meta packets of each vehicle may be exchanged among the system vehicles using the wireless network device 82 associated with the multimedia system 80 on each system vehicle. For example, the data receiver 84 may determine received and/or non-received encoded meta packets of the original broadcasted multimedia file. The received and/or non-received encoded meta packets may be determined based on the encoded meta packets received from the data broadcast by the transmitter 18 shown in FIG. 1 or from other wireless network devices associated with other system vehicles, described in greater detail hereinafter. The decoder 56 shown in FIG. 2 or the data storage device 86 may alternatively determine received and/or non-received encoded meta packets of the original broadcasted multimedia file.

A request signal for non-received encoded meta packets may be transmitted by the wireless network device 82 to other system vehicles. For example, a request signal for a range of encoded meta packets, corresponding to encoded meta packets that have not yet been received by a requesting vehicle, may be transmitted to other system vehicles. Received encoded meta packets of one vehicle may also be transmitted by the wireless network device 82 in response to a request signal from one or more other system vehicles. After receiving the request signal, a determination or comparison is made by a receiving vehicle of which encoded meta packets stored in the data storage device 86 are available for transmission in response to the request signal. This determination may be made by one of the data receiver 84, data storage device 86, wireless network device 82, or decoder 56 (FIG. 2). In response to the received request signal, the wireless network device of the receiving vehicle may transmit encoded meta packets stored in the data storage device 86 that correspond to the encoded meta packets requested by the requesting vehicle. Encoded meta packets received by the wireless network device in response to a request signal are stored in the data storage device 86, and the number or range of received encoded meta packets corresponding to a particular multimedia file may be updated. Using the wireless network device 82 of each system vehicle allows an exchange of encoded meta packets among the system vehicles that generally decreases the amount of time required to download the threshold number of meta packets for reassembling the original multimedia file.

Although the data receiver 84 receives encoded meta packets of the group(s) of encoded meta packets from the transmitter 18 (FIG. 1) and the receiver of the wireless network device 82 receives encoded meta packets exchanged among system vehicles as shown in the exemplary embodiment of FIG. 4, reception of the encoded meta packets from the transmitter 18 (FIG. 1) and from other system vehicles may be accomplished by a single receiver unit. Additionally, the transmitter of the wireless network device 82 may be combined with such single receiver unit in a single transceiver configuration. The particular configuration of receivers and transmitters is not critical to the operation of the multimedia system 80.

In one exemplary embodiment, the wireless network device 82 operates in a wireless network protocol that is different from the wireless protocol used for originally broadcasting the groups of encoded meta packets, such as by the transmitter 18 shown in FIG. 1. Those of ordinary skill in the art will appreciate that the communication band used for broadcasting the groups of encoded meta packets from the transmitter 18 may also differ from the communication band used for exchanging data regarding encoded meta packets among the system vehicles. For example, the wireless protocol used for transmission of the encoded meta packets from the transmitter 18 shown in FIG. 1 to the data receiver 28, 84 may be based on a satellite transmission protocol and corresponding communication band, whereas the wireless protocol used for exchanging the request signals and encoded meta packets among the system vehicles may be based on an IEEE 802.11 series or Wi-Fi standard. The type of wireless protocol or form of wireless communication between the transmitter 18 and the data receiver 28, 84 or between the wireless network devices 82 of the system vehicles is not critical to the operation of the system for wireless broadcasting 10 or the multimedia system 80 so long as the data packets associated with each multimedia file are encoded such that reassembly may be accomplished upon receipt of the threshold number of data packets.

Figure 5:
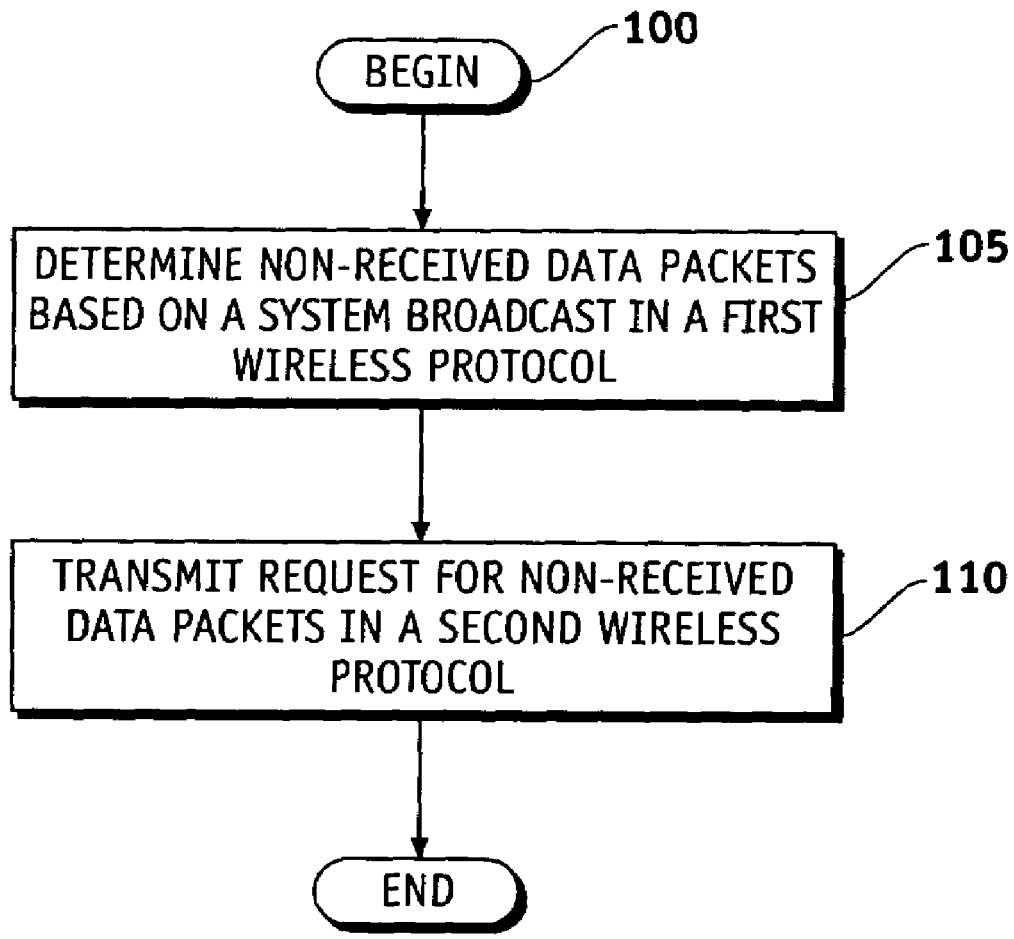
FIG. 5 is a flow chart of an exemplary method of wireless vehicle-to-vehicle exchange of multimedia data.

FIG. 5 is a flow chart of an exemplary method of wireless vehicle-to-vehicle exchange of multimedia data. The method begins at step 100. Non-received encoded meta packets from a broadcast of a group(s) of encoded meta packets by the transmitter 18 (FIG. 1) are determined by a component of the multimedia system 80 (FIG. 4) at step 105. For example, the data storage device 84 (FIG. 4), wireless network device 82 (FIG. 4), or associated decoder 56 (FIG. 2) may determine non-received encoded meta packets. The group of encoded meta packets correspond to an original multimedia file and are broadcasted by the transmitter 18 (FIG. 1) in a wireless protocol having a relatively long range of operation, such as used in satellite communications.

A request for the non-received encoded meta packets is transmitted by the wireless network device 82 (FIG. 4) at step 110 to the other system vehicles. The request is transmitted by the wireless network device 82 using a wireless network protocol having a relatively shorter range of operation than used for the original broadcast by the transmitter 18 (FIG. 1) of the group(s) of encoded meta packets. For example, the transmitter 18 (FIG. 1) may broadcast the group of encoded meta packets using satellite uplinks and downlinks, and the wireless network device 82 may transmit a request signal using an IEEE 802.11 series standard, such as Wi-Fi, having a relatively short range of operation.

When determining the non-received encoded meta packets, the encoded meta packets received from the original system broadcast by the data receiver 84 (FIG. 4) as well as the encoded meta packets received by the wireless network device 82 (FIG. 4), all corresponding to the same multimedia file, may be used to update a current determination of the non-received encoded meta packets.

Upon receiving a request for non-received encoded meta packets from a requesting vehicle, the wireless network device 82 (FIG. 4) may determine which encoded meta packets stored in a corresponding data storage device 86 (FIG. 4) are available for transmission in response to the request. The wireless network device 82 (FIG. 4) may subsequently transmit such available encoded meta packets to the requesting system vehicle. Additionally, a decoder 56 (FIG. 2) may decode the received encoded meta packets upon receipt of a threshold number of encoded meta packets associated with a particular multimedia file. The multimedia file may then be re-assembled by the decoder 56 (FIG. 2) for playback by the playback device 58 (FIG. 2).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A multimedia system for a vehicle, said system comprising:
   a data storage device configured to store multimedia data packets transmitted by a system broadcast;
   a processor coupled to said data storage device and configured to determine a non-received group of multimedia data packets based on said stored multimedia data packets of said system broadcast; and
   a transceiver coupled to said processor, said transceiver configured to:
   transmit a request signal for multimedia data packets of said non-received group of multimedia data packets; and
   receive multimedia data packets transmitted from said system broadcast and multimedia data packets transmitted from a system vehicle in response to said request signal.

2. A multimedia system according to claim 1, wherein said data storage device is further configured to store said multimedia data packets received from said system vehicle.

3. A multimedia system according to claim 2, wherein said processor is configured to determine said non-received group of multimedia data packets based on said stored multimedia data packets received from said system vehicle and said stored multimedia data packets received from said system broadcast.

4. A multimedia system according to claim 2, wherein said transceiver is further configured to receive a request signal transmitted from said system vehicle; and
   wherein said processor is further configured to determine available multimedia data packets based on said stored multimedia data packets for transmission in response to said request signal received from said system vehicle.

5. A multimedia system according to claim 4, wherein said transceiver is further configured to:
   wirelessly receive in a first wireless protocol said multimedia data packets of said system broadcast; and
   wirelessly receive in a second wireless protocol said multimedia data packets of said system vehicle and said request signal transmitted from said system vehicle.

6. A multimedia system according to claim 5, wherein said transceiver further configured to wirelessly transmit in said second wireless protocol said request signal for multimedia data packets of said non-received group of multimedia data packets.

7. A multimedia system according to claim 1 further comprising:
   a decoder coupled to said data storage device, said decoder configured to:
   access said multimedia data packets stored in said data storage device;
   associate each of said multimedia data packets stored in said data storage device with a multimedia data file; and
   assemble said multimedia data file upon receiving a threshold number of multimedia data packets, said data storage device configured to store said assembled multimedia data file.

8. A wireless network apparatus for vehicles, said apparatus comprising:
   a vehicle receiver configured to receive multimedia data packets transmitted from a system broadcast;
   a data storage device coupled to said vehicle receiver, said data storage device configured to store said multimedia data packets received by said vehicle receiver;
   a processor coupled to said data storage device, said processor configured to identify multimedia data packets stored in said data storage device with a multimedia file and determine a non-received group of multimedia data packets and a received group of multimedia data packets based on said multimedia data packets stored in said data storage device;
   a transceiver coupled to said processor, said transceiver configured to:
   receive multimedia data packets transmitted from a system vehicle and a request signal transmitted from said system vehicle; and
   transmit at least one signal selected from a signal requesting multimedia data packets of said non-received group of multimedia data packets, a status signal indicating said received group of multimedia data packets, and a group of multimedia data packets in response to said request signal transmitted by said system vehicle, said data storage device further configured to store said multimedia data packets received by said transceiver.

9. A wireless network apparatus according to claim 8, wherein said processor is configured to determine said non-received group of multimedia data packets and said received group of multimedia data packets based on said multimedia data packets received by said vehicle receiver and said multimedia data packets received by said transceiver.

10. A wireless network apparatus according to claim 9, wherein said vehicle receiver is configured to receive multimedia data packets in a first wireless protocol within a first operating range; and
wherein said transceiver is configured to receive multimedia data packets in a second wireless protocol within a second operating range, said first operating range greater than said second operating range.

11. A wireless network apparatus according to claim 8, wherein said processor is further configured to assemble said multimedia data file upon receiving a threshold number of multimedia data packets, said data storage device configured to store said assembled multimedia data file.

12. A wireless network apparatus according to claim 11 further comprising a playback device coupled to said data storage device, said playback device configured to read said assembled multimedia data file.

13. A multimedia system for a vehicle, said system comprising:
a first receiver configured to wirelessly receive multimedia data packets transmitted from a system broadcast during operation of the vehicle;
a data storage device coupled to said first receiver, said data storage device configured to store said multimedia data packets received by said first receiver;
a processor coupled to said data storage device, said processor configured to:
access said stored multimedia data packets in said data storage device;
identify each of said stored multimedia data packets with a multimedia data file; and
determine non-received multimedia data packets based on said stored multimedia data packets in said data storage device;
a vehicle-network transmitter coupled to said processor and said data storage device, said vehicle network transmitter configured to transmit a request for said non-received multimedia data packets; and
a second receiver coupled to said data storage device, said second receiver configured to wirelessly receive multimedia data packets transmitted from a system vehicle and a request signal for multimedia data packets transmitted from said system vehicle during operation of the vehicle, said data storage device further configured to store said multimedia data packets received by said second receiver.

14. A multimedia system according to claim 13 wherein each multimedia data packet of said multimedia data packets received by said first receiver and said multimedia data packets received by said second receiver is encoded.

15. A multimedia system according to claim 14 further comprising a decoder coupled to said data storage device, said decoder configured to decode and assemble said multimedia data file upon receiving a threshold number of multimedia data packets, said data storage device configured to store said assembled multimedia data file.

16. A multimedia system according to claim 15, wherein said processor is further configured to determine available multimedia data packets for transmission in response to said request signal transmitted from said system vehicle based on said stored multimedia data packets.

17. A multimedia system according to claim 13 further comprising a playback device coupled to said data storage device, said playback device configured to process said assembled multimedia data file.

18. A multimedia system according to claim 13, wherein said data storage device is a hard drive.

19. A method of wireless vehicle-to-vehicle exchange of multimedia data, said method comprising the steps of:
determining non-received multimedia data packets based on a system broadcast in a first wireless protocol;
requesting multimedia data packets of the non-received multimedia data packets in a second wireless protocol from system vehicles;
receiving a request for multimedia data packets in the second wireless protocol;
determining available multimedia data packets of the requested multimedia data packets for transmission; and
transmitting the available multimedia data packets in the second wireless protocol.

20. A method according to claim 19 further comprising the steps of:
receiving the available multimedia packets;
decoding the received available multimedia data packets; and
assembling a multimedia data file upon receipt of a threshold number of the received available multimedia data packets.

21. A method according to claim 19 further comprising the step of determining non-received multimedia data packets based on the system broadcast and a system vehicle transmission in the second wireless protocol.

* * * * *